United States Patent [19]

Kreeger et al.

[11] 3,899,662

[45] Aug. 12, 1975

[54] METHOD AND MEANS FOR REDUCING DATA TRANSMISSION RATE IN SYNTHETICALLY GENERATED MOTION DISPLAY SYSTEMS

[75] Inventors: Richard C. Kreeger, Phoenix; Matthew O. Kuitunen, Glendale, both of Ariz.

[73] Assignee: Sperry Rand Corporation, New York, N.Y.

[22] Filed: Nov. 30, 1973

[21] Appl. No.: 420,748

[52] U.S. Cl. ............ 235/151; 340/324 A; 178/6.8; 178/DIG. 20; 178/DIG. 22

[51] Int. Cl. ............ G06f 15/20

[58] Field of Search .......... 340/324 A; 178/DIG. 20, 178/DIG. 22, DIG. 3; 235/151, 150.26, 150.27

[56] References Cited

OTHER PUBLICATIONS

"Cathode-Ray Tube Video Refresher," IBM Technical Disclosure Bulletin, Vol. 15, No. 3, Aug. 1972.

*Primary Examiner*—Eugene G. Botz
*Attorney, Agent, or Firm*—Howard P. Terry

[57] ABSTRACT

A digitally controlled synthetically generated motion display system in which the data to be displayed is provided in bit serial fashion from a master computer to a stroke writing symbol generator for displaying the resulting pictures. Words defining picture frames to be displayed at a relatively low repetition frequency (for example, one frame per second) are generated in the master computer and transmitted to and stored in the symbol generator. Interspersed with the frame defining words, translation and rotation increment words are generated in the master computer and transmitted to the symbol generator at a relatively high repetiton frequency (for example, 20 times a second) wherein they are combined with the previously transmitted frame defining words to generate incremented frame defining words which when utilized by the symbol generator result in the display of sequentially related picture frames providing the illusion of smooth motion without the necessity of generating and transmitting all of the words required to define each displayed frame.

15 Claims, 5 Drawing Figures

| WORD NAME | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|---|
| CONTROL INSTRUCTIONS | | | | | | | | | | | | | | | | | | | | | | | | | | | | | | | | |
| END OF INCREMENTAL | P | | | | | | | | | | | | | | | | | | | | | | | | | | | | 0 | 0 | 1 | 0 |
| END OF BACKGROUND | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | | | | | | | | 0 | 0 | 0 | 1 |
| NO OPERATION | P | | | | | | | | | | | | | | | | | | | | | | | | | | | | 0 | 0 | 0 | 0 |
| VECTOR INSTRUCTIONS | | | | | | | | | | | | | | | | | | | | | | | | | | | | | | | | |
| SOLID LINE | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | $I_1$ | $I_0$ | $R_1$ | $R_0$ | 0 | 0 | 0 | 1 | 0 | 0 | 0 |
| LONG DASH LINE | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | $I_1$ | $I_0$ | $R_1$ | $R_0$ | 0 | 0 | 1 | 1 | 0 | 0 | 0 |
| SHORT DASH LINE | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | $I_1$ | $I_0$ | $R_1$ | $R_0$ | 0 | 1 | 0 | 1 | 0 | 0 | 0 |
| DOTTED LINE | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | $I_1$ | $I_0$ | $R_1$ | $R_0$ | 0 | 1 | 1 | 1 | 0 | 0 | 0 |
| SYMBOL INSTRUCTION | | | | | | | | | | | | | | | | | | | | | | | | | | | | | | | | |
| SYMBOL IDENTITY | P | $A_6$ | $A_5$ | $A_4$ | $A_3$ | $A_2$ | $A_1$ | $A_0$ | $A_6$ | $A_5$ | $A_4$ | $A_3$ | $A_2$ | $A_1$ | $A_0$ | $A_6$ | $A_5$ | $A_4$ | $A_3$ | $A_2$ | $A_1$ | $A_0$ | $I_1$ | $I_0$ | | | 1 | | 1 | 1 | 0 | 0 |
| SPECIAL INSTRUCTIONS | | | | | | | | | | | | | | | | | | | | | | | | | | | | | | | | |
| TRANSLATION | P | $Y_9$ | $Y_8$ | $Y_7$ | $Y_6$ | $Y_5$ | $Y_4$ | $Y_3$ | $Y_2$ | $Y_1$ | $Y_0$ | $X_9$ | $X_8$ | $X_7$ | $X_6$ | $X_5$ | $X_4$ | $X_3$ | $X_2$ | $X_1$ | $X_0$ | | | | | | | | 0 | 1 | 0 | 0 |
| TRACK/HEADING ANGLE [SIN/COS] | P | $S_9$ | $S_8$ | $S_7$ | $S_6$ | $S_5$ | $S_4$ | $S_3$ | $S_2$ | $S_1$ | $S_0$ | $C_9$ | $C_8$ | $C_7$ | $C_6$ | $C_5$ | $C_4$ | $C_3$ | $C_2$ | $C_1$ | $C_0$ | | | | | | | | 0 | 1 | 0 | 1 |
| TRACK/HEADING ANGLE [DEGREES] | P | $H_3$ | $H_2$ | $H_1$ | $H_0$ | $T_3$ | $T_2$ | $T_1$ | $T_0$ | $U_3$ | $U_2$ | $U_1$ | $U_0$ | $D_3$ | $D_2$ | $D_1$ | $D_0$ | | | | | $I_1$ | $I_0$ | | | | | | 1 | 1 | 1 | 0 |

LEGEND

A = 7 BIT ASCII CODE
C = COSINE
D = DECIMAL [TENTHS]
H = HUNDREDS
L = LARGE CHARACTERS

I = INTENSITY

| $I_1$ | $I_0$ | |
|---|---|---|
| 1 | 1 | MAXIMUM |
| 0 | 1 | MEDIUM |
| 1 | 0 | DIM |
| 0 | 0 | OFF |

R = ROTATE / INCREMENT

| $R_1$ | $R_0$ | |
|---|---|---|
| 0 | 0 | ROTATE / INCREMENT |
| 0 | 1 | NO ROTATION X-INCREMENT ONLY |
| 1 | 0 | NO ROTATION Y-INCREMENT ONLY |
| 1 | 1 | NO ROTATION / NO INCREMENTS |

S = SINE
T = TENS
U = UNITS
X = X-DEFLECTION
Y = Y-DEFLECTION
P = PARITY

FIG. 4.

METHOD AND MEANS FOR REDUCING DATA TRANSMISSION RATE IN SYNTHETICALLY GENERATED MOTION DISPLAY SYSTEMS

BACKGROUND OF THE INVENTION

1. Field of the Invention

The invention relates to synthetically generated motion displays particularly as related to cathode ray tube (CRT) display systems in which the data is provided in digital format. More specifically the invention is applied to a stroke written CRT display for aircraft for displaying to the pilot his horizontal situation, i.e. the position and motion of the aircraft relative to ground references and terrain features. However, while the preferred embodiment of the invention disclosed herein is in terms of a moving map display, it will be appreciated that the basic principles involved are applicable in any digitally controlled motion display system.

2. Description of the Prior Art

Digitally controlled synthetically generated motion display systems are known in the prior art for displaying sequentially related picture frames using stroke writing techniques (as opposed to raster scan techniques) for presenting an illusion of a smoothly moving picture. Such systems are advantageously utilized as moving map displays for aircarft area navigation systems. Each sequentially related picture frame comprises a group of lines and symbols (information elements) such as desired flight path, actual course, alphanumeric representations of destination, way points, geographical features, etc., each symbol and its position being defined on a Cartesian coordinate system by digital instruction words and digital X and Y numbers. For example, a 8 inch by 6 inch picture may require some 200 sets of instruction and X, Y numbers for a reasonably defined "map" picture. As is known, 16 slightly different frames per second will provide a sense of smooth motion to the human eye. 20 frames a second is considered satisfactory.

Each displayed frame is created by stroke writing techniques wherein the CRT beam is caused to move from point to point on the screen by suitable control signals applied to the deflection means of the tube, which may be electromagnetic or electrostatic, the visible and blanked beam motion being controlled by suitably gating the cathode. In prior displays of this type, each picture frame, which may consist of from 200 to 1,000 elements were represented by as many digital words of, for example, 32 bits per word, and for persistency of vision it was necessary to generate 20 complete frames per second. Generally the digital words required for generating the frames are produced in a master computer and transmitted to a symbol generator computer before drawing the pictures on the CRT screen. Generally, and particularly for airborne environments, it is desirable to minimize required hardware. Thus, in such systems it is considered desirable to utilize a bit serial data transmission scheme wherein the bits of the digital words are transmitted along a single data bus within the system.

Therefore, in these prior systems the digital information had to be generated in the master computer, stored therein, transmitted along the single data bus to the symbol generator computer, stored in the symbol generator computer, decoded as "drawing" instructions and corresponding signals applied to the CRT deflection and video circuits all under control of the computer program. Thus, to draw 20 complete frames per second the CRT digital control and program had to handle from 128,000 to 640,000 bits per second. This high bit rate requirement resulted in complex and expensive computer hardware and software and in some applications required computer data rate performance exceeding that available from state of the art computers or alternately precluded single bus data transmission.

SUMMARY OF THE INVENTION

It is the object of the present invention to signficantly reduce the data rate requirements in digital synthetic motion displays thus accruing the concommitant savings in computer hardware and software.

It is a particular object to reduce the data rate so as to permit single bus data transmission.

These objects are accomplished by generating the digital words for defining complete picture frames at a relatively low repetition frequency (for example, one frame per second) and generating translation and rotation increment words to define the incremental motion occurring between the generation of the low frequency frames. The complete frame data (background words) as well as the incremental motion data (incremental words) are generated and transmitted by the system master computer to the symbol generator computer in bit serial fashion along a single data bus. Incremental words are transmitted at a relatively high repetition frequency (for example, 20 times per second) and are combined at this rate at the symbol generator with all of the background words representing elements to be translated and/or rotated so as to provide sequentially related picture frames with the illusion of smooth motion without the necessity of generating and transmitting all of the words required to define each displayed frame.

BRIEF DESCRIPTION OF THE DRAWINGS

FIG. 4 is a table showing the formats of the digital information words utilized in the system.

DESCRIPTION OF THE PREFERRED EMBODIMENTS

Figure 1:
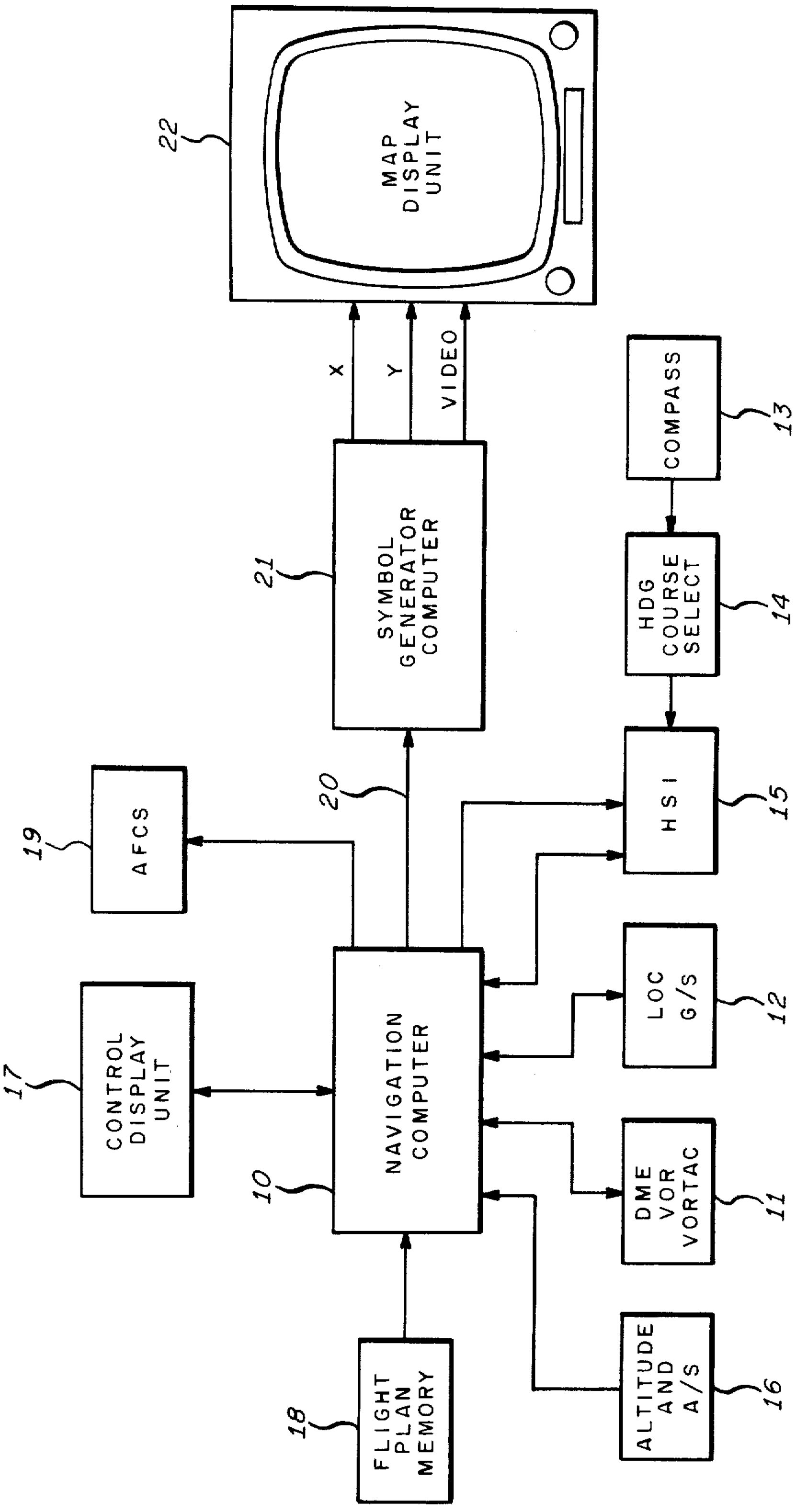
FIG. 1 is a schematic block diagram of an aircraft area navigation system including a moving map display.

In the preferred embodiment sequentially related picture frames displayed at, for example, twenty frames per second, are precisely defined or updated at one second intervals by sets of Cartesian coordinate number pairs while the intermediate frames are defined by number sets consisting only of successive Cartesian translation and/or rotation increments which occur during the second. Thus, only one picture per second is completely defined by the desired number of picture elements represented by the corresponding sets of X, Y, pairs of numbers and the illusion of motion of the picture defined by this set of numbers is provided by incrementing in translation and/or rotation by a small amount twenty times per second each picture element which is to be moved.

Thus in accordance with the present invention only one picture frame of the required number of picture elements, say two hundred, represented by X, Y number pairs or digital words is stored for each one second of display and this set of number words is transmitted serially in bursts of say twenty groups of different words via the single data bus to the display control memory. Each pair of X, Y number words is decoded as an instruction to draw a line or a symbol on the CRT screen and the line or symbol is drawn using suitable latching registers, digital-to-analog converters (D/A) and deflection and video drivers in a manner to be later described. The elements of this one picture frame may be designated as the background data and the X, Y number words designated as the background data words. After the first burst of X, Y word transmissions, during the next succeeding one second interval all of the twenty groups of background words transmitted during the prior second are incremented twenty times in translation and/or rotation by corresponding sets of X, Y incremental words transmitted immediately following each of the background word bursts for the next second. These incremental words modify the prior background words twenty times a second. The resultant new sets of X, Y number words are decoded as instructions to draw lines and/or symbols which are slightly different in position on the screen from their prior position. The resulting display is therefore slightly shifted twenty times a second and provides an illusion to the pilot of a smoothly moving picture.

The incremental translation of the entire picture frame is accomplished by the addition of incremental translation words ($\Delta X$ and $\Delta Y$ values) to each set of $X$, $Y$ coordinate values of elements to be translated that define the picture frame. The translation is accomplished in accordance with the following equations:

$$X_h = X_i + \Delta x_m$$
$$Y_h = y_i + \Delta Y_m \qquad (1)$$

where $1 \leq i \leq N$ ($N$ = typically less than 200) and where $m$ is the most recent incremental value.

The rotation of the entire picture frame is accomplished by coordinate transformation of each set of translated $X$, $Y$ coordinates by the following equations:

$$X_k = X_h \cos \phi_m + Y_h \sin \phi_m$$
$$Y_k = X_h \sin \phi_m + Y_h \cos \phi_m \qquad (2)$$

where $\phi_m$ is the most recent rotation angle and is obtained from the track or heading angle data of the aircraft, the track angle being the angle of the ground track with respect to north.

The present invention will be described herein in connection with an electronic horizontal situation indicator or moving map display which is associated with an aircraft area navigation system. A moving map display is an important component of an area navigation system in that it presents to the pilot a realistic, although symbolic, picture of the position and movement of the aircraft relative to the area over which it is flying; i.e., the pilot's progress in following the flight plan. Furthermore, such a display is useful to the pilot should it become necessary to change the flight plan to an alternate. Such a display also advises the pilot of terrain features such as mountain peaks or restricted flying areas relative to the present position and future flight path of the craft.

Referring to FIG. 1, a basic area navigation system is schematically illustrated in block diagram form. The system comprises a digital navigation computer 10 to which is provided basic navigation data from one or more VOR, DME, Or VORTAC, radio receivers 11; LOC and glide slope (G/S) receivers 12; and present and selected heading via a compass system 13, heading-/course selector 14 and display instrument 15 such as a conventional horizontal situation indicator (HSI). For controlling the vertical flight path profile, altitude and air speed data are supplied by a suitable air data system 16. Pilot communication with the area navigation system is provided by means of a pilot's control display panel 17. Navigation data for executing a predetermined flight plan, together with similar data for predetermined alternate flight plans, is prepared before flight and entered into a suitable auxiliary or flight plan memory 18, part of which may be in permanent computer memory and part of which may be "plugged into" the navigation system and is interrogated thereby as the flight plan is carried out. The navigation computer 10 also provides control signals to a conventional aircraft flight control system (AFCS) 19 for controlling the flight path of the aircraft.

The navigation computer 10 provides, over a single data bus 20 in accordance with the teachings of the present invention, the navigation data to be displayed on the moving map display. This data is processed in a symbol generator computer 21, the outputs of which are horizontal (X) and vertical (Y) deflection and video signals for the cathode ray tube of a map display unit 22.

As discussed above, the geographical features are preestablished in terms of their latitude and longitude position or other position identifiers alpha/idents, transmission frequencies, terrain peak altitudes, etc. Such geographical features are, for example, features fixed relative to the ground for a particular geographical area, for example, all VOR/DME, VORTAC and/or other ground based radio aids, together with mountain peaks, rivers, restricted flight areas, etc. This data is also pre-established in terms of major and minor air routes.

Airway routes throughout the world have been preestablished by federal and international regulations and, in general, are defined by specific VOR, VORTAC or other ground based radio aids to navigation and arbitrary way points referenced thereto. In addition, standard departure routes and standard approach routes have been well established in terms of VOR, TAC or related way points. Furthermore, hazard areas such as military training areas and mountain peaks have been defined in terms of their ground position, for example, by latitude and longitude points. Thus, for any given area, all this data, including specific air routes is predetermined and for a particular flight from a specific departure airport to a specific arrival airport, the flight plan filed by the pilot to air traffic control, (ATC) is in terms of this established data.

All of the fixed geographical data required for air navigation within a particular area may be stored in digital format in an on-board memory, or alternatively certain predetermined fixed data, such as VORs, VORTACs, etc. for a large area, e.g. an airline's entire route structure, may be stored in a permanent read only memory (ROM) while up date or variable data, such as way points, route changes, etc. for a particular route or routes may be stored in an auxiliary memory which may be carried on board and plugged into the computer 10. The entire flight plan as filed may be carried out by the pilot entering the flight plan data into the navigation computer 10 by means of the control display unit 17.

Generally the above described individual units such as the blocks 11–19 are conventional components well known in the flight control art and will not be further described herein for brevity.

Figure 2:
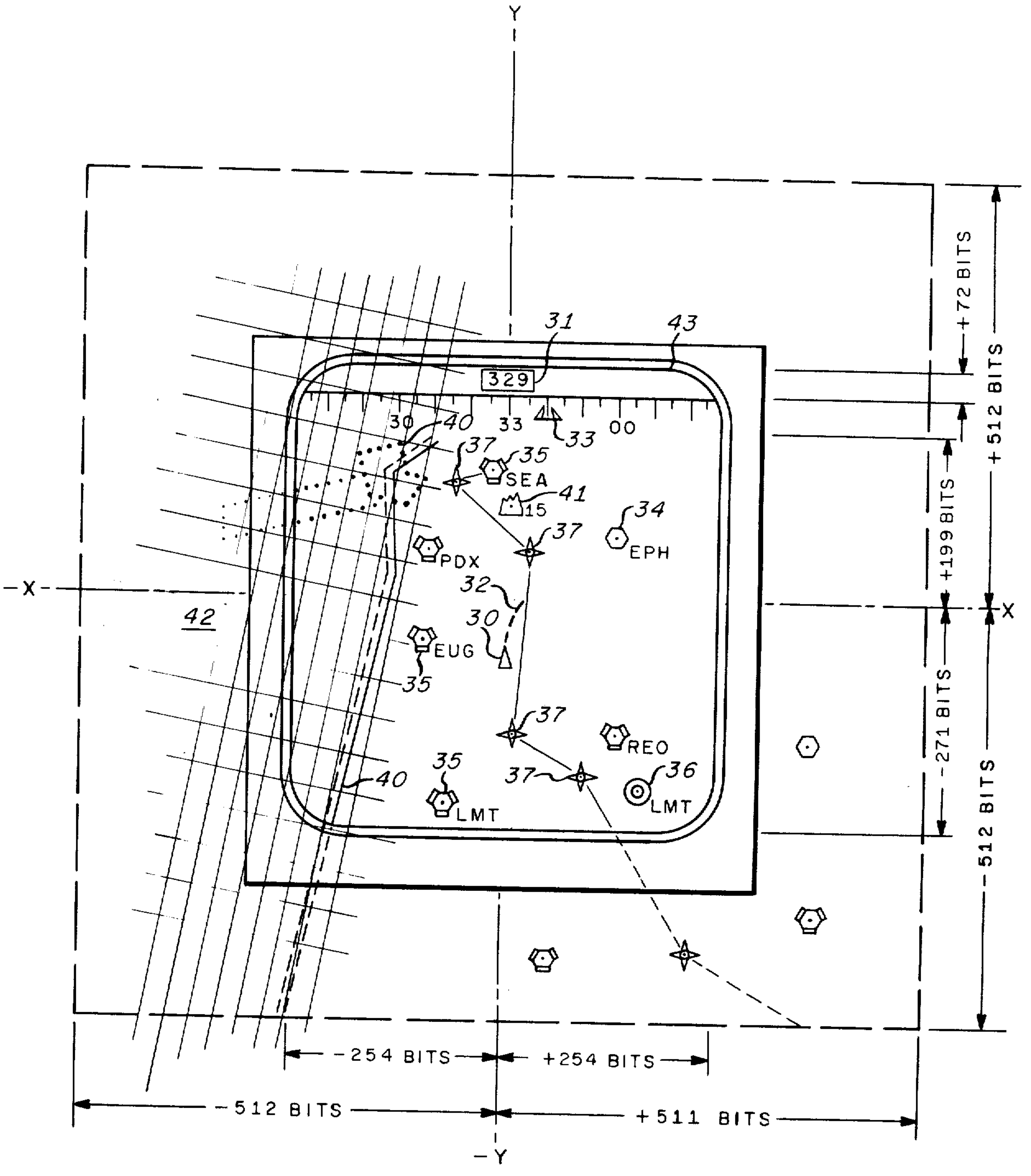
FIG. 2 is an illustration of a typical displayed map.

Referring now to FIG. 2, a portion of a typical flight plan that may be displayed to the pilot on the map display 22 (FIG. 1) is illustrated. The parameters or data displayed may be categorized into four groupings; data concerning the aircraft, data concerning navigation aid facilities, data concerning the flight plan and data concerning map or ground information. Data concerning the aircraft may include an aircraft position symbol 30, a window 31 for displaying the aircraft ground track angle with respect to north, an aircraft trend vector 32 which comprises five dashed lines emanating forwardly from the aircraft symbol 30 predicting the future horizontal flight path for a predetermined time interval and a selected track or heading cursor 33 as well as an associated scale. Data concerning navigation aid facilities may include VOR stations 34 such as EPH, DME and VOR/DME 35 such as SEA, REO and ADF markers 36 such as LMT. Data concerning the flight plan may include way points 37 as well as reporting points airway identifiers and the like. Data concerning map or ground information may include restricted areas 40 such as air defense zones, flight information regions, mountain peaks 41, holding patterns as well as latitude and longitude lines 42 over water. All of the symbols are drawn on the face of the CRT using well known calligraphic or stroke writing techniques. Certain of the displayed data may be considered fixed in that they are not moved over the display face as the map is moved. Such fixed data may be the aircraft reference symbol 30, track angle scale and track angle readout 31 as well as the selected track angle cursor 33 which symbols are always located along the top edge of the display. The remaining data such as the navigation aid facilities, flight plan data and the map information is considered to be movable data which changes position as the aircraft moves along its flight plan track which provides the illusion of the map moving with respect to the aircraft symbol 30 as the craft passes over the terrain.

The area navigation computer 10 is the source of all the data to be displayed, generating, storing and providing all of the display elements, say 200, in terms of their X, Y coordinate positions for each one second of display time. As shown in FIG. 2 this X, Y position data is represented by a predetermined number of bits in the X and Y directions relative to the center ($X = 0$ bits, $Y = 0$ bits) of the display indicator. The viewable screen 43 is superimposed on the X, Y coordinate system illustrated in FIG. 2. The general shape of the screen is a rectangle which is defined horizontally by $-254 \leq X \leq +254$ and vertically by $-271 \leq Y \leq +271$. Each integer represents a distance in binary bits in a conventional manner. The top of the rectangle 43 within the area $-264 \leq X \leq +264$ and $+199 \leq Y \leq +271$ is reserved for the display of the track or heading indicator which consists of the angle display 31, the track/heading select cursor 33 and the associated track/heading scale. Each binary bit of the X, Y coordinate system is scaled to provide the display rectangle 43 within the bezel (not shown) of the map display unit 22 (FIG. 1).

Figure 3:
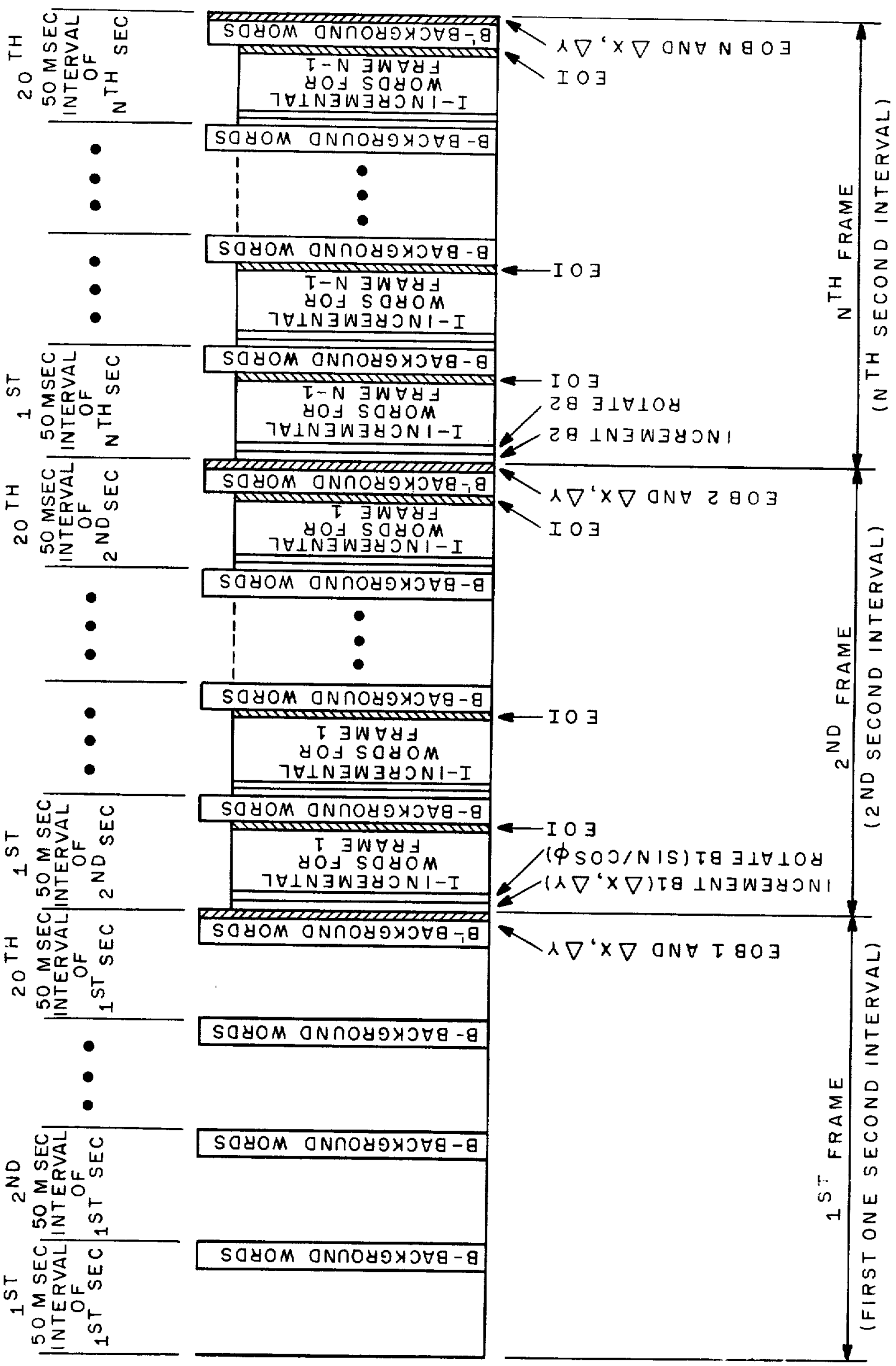
FIG. 3 is a diagram showing the timing sequence of the information transfer in accordance with the invention.

The principle of information transfer utilized in accordance with the invention will now be explained with regard to FIG. 3 as well as with reference to FIG. 1. The commands to the symbol generator computer 21 are generated, formated and assembled in the navigation computer 10 and are transmitted in bit serial fashion along the data bus 20 as 32 bit digital words. Most of the words are instructions to the symbol generator computer 21 to write characters or to draw lines that define the aircraft horizontal situation. The remaining digital words are used for system control in a manner to be explained. The transmission scheme of the digital word data is depicted in FIG. 3. A frame of information, which depicts an instantaneous position picture, is defined by, for example, 260 digital word instructions to draw lines or characters. The first frame, as indicated by the legend, is transmitted to the display system in twenty groups of 13 words during one second, which groups are referred to as background word groups. Each group is transmitted within a 50 millisecond interval. The words in the group are transmitted at a word rate of 1 kilohertz. Therefore, each background group requires only 13 milliseconds of the 50 millisecond interval for transmission.

After the one second interval required to transmit a frame has elapsed, the navigation computer 10 transmits groups of incremental information at the rate of 20 times a second to the symbol generator computer 21. The incremental information is alternated with the background words for the second frame. Each incremental information group comprises X and Y translation increments as well as new track angles for translating and rotating the map display. This incremental information is utilized to modify instructions in the previous frame of background data in accordance with equations 1 and 2 given above. Since the instructions are commands to write characters at or to draw vectors between X and Y coordinates, the modification results in the translation and rotation of the horizontal situation map frame at a rate of 20 times a second.

The incremental word groups are also utilized to control the drawing or writing of symbols which change rapidly relative to the motion of the map. The trend vector 32 (FIG. 2) is an example of such a symbol which is essentially redrawn 20 times a second.

This process of information transfer defined above is continually repeated. The effect is a transmission of digital words wherein groups of 13 background words alternate with groups of 37 incremental words. This division between background and incremental words is not critical, other divisions being possible depending on the required display information density and the required amount of rapidly changing data.

Control words such as End-of-Background (EOB) containing Δ increments as well as End-of-Incremental (EOI) control words are also transmitted for reasons to be explained.

Referring now to FIG. 4 the formats for the digital words generated by the navigation computer 10, FIG. 1) and transmitted to the symbol generator computer 21 as described above with regard to FIG. 3 are illustrated. The digital words are 32 bit words transmitted in bit serial fashion least significant bit first and comprise four different types of instructions, viz., control instructions, vector instructions, symbol instructions and special instructions as indicated by the legends in FIG. 4. The most significant bit of each of the words performs the well known parity function and the least four significant bits in each word are coded to identify the word type. The blank bit positions are not utilized in performing the functions associated with the words.

The control instruction words are utilized by the symbol generator computer 21 (FIG. 1) for controlling the digital word transmission from the navigation computer 10 (FIG. 1). These words comprise the End-of-Incremental (EOI), End-of-Background (EOB) and No-Operation instruction words. The End-of-Incremental instruction word notifies the symbol generator computer 21 that it is the last word in a transmitted incremental word group. The End-of-Background instruction word notifies the symbol generator computer 21 that it is the last word of background data for a transmitted frame. The EOB word also contains the first values of the binary X and Y translation increments utilized for updating the display by applying the increments to the frame ending in the particular EOB word transmitted. The X and Y binary values are contained in bit positions 12–21 and 22–31 respectively, which numbers are referenced to the X, Y coordinate scheme illustrated in FIG. 2. The No-Operation instruction word is utilized as a filler for either the background or incremental word groups and conveys to the symbol generator 21 that no operation is to be performed in response thereto.

The vector instruction word is transmitted to the symbol generator computer 21 as a command to draw a line by moving the CRT beam from its present position to the position designated by the instruction. Bit positions 5 and 6 designate the type of vector to be drawn, i.e., solid, long dash, short dash or dotted, in accordance with the binary codes indicated. The bit positions 8 and 9 determine whether the starting point of the line being drawn should be rotated by the latest incremental rotation word about the aircraft symbol origin and whether the X, Y end points for the word should be changed by the current X, Y translation increments. The legend in FIG. 4 shows the coding for the various decisions to be made by the symbol generator computer 21 with regard to the R-bits 8 and 9. Bits 10 and 11 of the word control the video intensity of the line being drawn. The legend in FIG. 4 indicates the various control code combinations for the intensity of the line. It should be noted that these I-bits permit an invisible or blanked vector to be drawn by utilizing the off code for the word. The bits 12–21 and 22–31 define the X and Y end coordinates respectively of the line being drawn. Further details of the manner in which the vectors are generated will be later described.

The symbol instruction comprises the symbol identity word and is transmitted to the symbol generator computer 21 as a command to write a string of pre-defined symbols. The starting point of a symbol is either the present position of the CRT beam or may be defined by an invisible vector drawn to the desired starting point in a manner to be further described. All of the coordinates for each of the predetermined symbols or characters to be drawn by the system may be stored in the symbol generator computer 21 and called out for drawing by the symbol identity instruction in a manner to be explained. Bit position 6 of the symbol identity instruction instructs the symbol generator computor 21 to generate either a large or a nominal size character by appropriate conventional scaling circuits. The bit positions 9 and 10 control the intensity of the symbols again in the manner described above with respect to the vector instruction word. The bit positions 11–17, 18–24 and 25–31 contain the symbol identification coding for three characters, respectively, to instruct the symbol generator computer 21 to draw the three symbols juxtaposed with respect to each other in a horizontal row. The binary symbol coding may be of any conventional format such as the well known ASCII character code which provides predetermined coding for all of the letters of the alphabet, the numerals 0 through 9 as well as miscellaneous symbols of the type discussed above with regard to FIG. 2. When it is desired not to utilize all three symbols, all zeros are utilized for the unused symbol positions.

The special instructions comprise the X, Y coordinate translation incremental word and the track/heading angle incremental rotation word (sin/cos) that are paramount to the principle of the present invention. These two instruction words are received by the symbol generator computer 21 from the navigation computer 10 every 1/20th of a second and are combined in accordance with equations 1 and 2 above with the background instruction words transmitted during the previous one second interval to provide the moving map illusion discussed above. The special instructions also include the track/heading angle word in terms of degrees for convenience of generating the numerical track/heading angle display in the window 31 (FIG. 2). The translation word provides the symbol generator computer 21 with the X and Y translation increments which when applied to the background instructions of a frame will result in the visual translation of that frame. The bit positions 12–21 and 22–31 oontain the binary X and Y translation increments respectively to be applied to the previous background frame in accordance with the equations above. These binary incremental values are referenced to the X, Y coordinate scheme illustrated in FIG. 2. The track/heading angle incremental rotation word in terms of sine and cosine provides the sine and cosine of the track/heading angle of the aircraft to the symbol generator computer 21 which when applied to the background instructions in a frame result in a visual rotation of that frame. The bit positions 12–21 and 22–31 contain the respective cosine and sine of the current track/heading angle and utilize this information for the coordinate transformations of equations 2 as described above. The track/heading angle degree word provides to the symbol generator computer 21 a four-digit binary coded decimal representation of the track/heading angle of the aircraft expressing hundreds, tens, units, and tenths of degrees. The symbol generator computer 21 uses the information for the display of the track/heading in the window 31 (FIG. 2). The bit positions 10 and 11 of the word control the intensity of the numerical display in the manner explained above with regard to the vector and symbol instruction words. The bit positions 16–19, 20–23, 24–27 and 28–31 contain the four bit binary coded decimal representations of the tenths, units, tens and hundreds digits respectively of the track/heading angle.

The transmission scheme of the above-described 32-bit words from the navigation computer 10 along the single data bus 20 to the symbol generator computer 21 has been discussed with respect to FIG. 3. During the first 996 milliseconds of a one second interval, 32-bit words are transmitted in bit-serial fashion to the symbol generator computer 21 at the rate of one word per millisecond. During each following one second interval, another 996 words are transmitted to the computer 21. The continuance of this process causes the symbol generator computer 21 to display a moving map in a manner to be further explained. During each one second interval, the navigation computer 10 organizes and transmits the words in the following order.

The first 37 words transmitted in a one second interval comprise an incremental word group. The first word thereof is the translation instruction, as described above with regard to FIG. 4, and contains the $\Delta X$ and $\Delta Y$ translation increments for the previous frame. The second word transmitted is the track/heading sine/cosine instruction and contains the sine and cosine of the latest track or heading angle of the aircraft and provides the incremental rotation for the previous frame. The third word transmitted is the track/heading (degrees) instruction and contains the latest track or heading angle in degrees for the window display 31 (FIG. 2). The fourth word transmitted is the track/heading cursor select position instruction and contains the current X and Y coordinates of the track/heading select cursor 33 (FIG. 2). The fifth word transmitted is the track/heading cursor select code which contains the ASCII code for the cursor symbol. The sixth word transmitted, is the airplane symbol position instruction which contains the current X, Y airplane position coordinates. The seventh word transmitted is the airplane symbol code instruction which contains the ASCII code for the triangular airplane symbol. The eighth to 36th words transmitted in this first group of incremental words, include vector instructions, symbol instructions and/or No-Operation instructions which draws a picture requiring to be redrawn every 50 milliseconds, i.e., those elements which cannot be redrawn by translation and rotation increments as described above. The 37th word is the End-of-Incremental instruction which designates the last incremental word in this incremental word group.

The 38th through 50th words comprise thirteen instructions including vector instructions, symbol instructions and/or No-Operation instructions which define the first portion (1/20th) of a background frame.

The words 51–87 comprise the second incremental word group and are similar to those described above with respect to words 1–37. The words 88–100 comprise the second portion of a background frame and are similar to those described above with respect to the words 38–50. The word transmission scheme for the one second interval described continues with alternating transmissions of incremental word groups and background word groups until the 995th instruction word which ends the transmission of the 20th portion of a background frame which follows the transmission of the 20th incremental word group where the 20th portion of the background frame contains only eight instruction words compared to the prior portions which contain 13 words each. The 996th word transmitted in the one-second interval is the End-of-Background word which designates the 256th background word and also contains the first translation increments for this background frame.

The navigation computer 10 (FIG. 1) generates, formats and sequentially assembles in sequence the digital instruction words generally in the manner described above and specifically in accordance with the moving map sequences to be displayed for the particular flight plan of the aircraft and the current flight data provided by the inputs to the computer 10. The specific background word groups are generated and assemblied in the particular sequence required to define one complete frame per second and the incremental translation and rotation words are interleaved with the background word groups each 1/20th of a second to be applied to the background word groups from the previous frame as described above and to be described in further detail hereinafter to provide the moving map illusion. For example, those picture elements that are drawn by vector instructions such as the elements 40 and 42 (FIG. 2) are provided by appropriate vector instructions in the background word groups with the specifically appropriate X and Y position data (bits 12–31), the appropriate intensity data (bits 10 and 11) and the appropriate rotate/increment data (bits 8 and 9) which R-bits will instruct the symbol generator computer 21 (FIG. 1) whether or not to apply the incremental translation and rotation words thereto in a manner to be further described. Specific symbols such as 30, 34, 35 and 37 (FIG. 2) as well as the associated alpha/ident characters are each provided by specifically appropriate symbol identity instruction words with the appropriate character identity codes (bits 11–31), the intensity control data (bits 9 and 10), as well as character size control data (bit 6). A character is drawn either at the current position of the CRT beam or the character instruction is preceded by an invisible vector instruction to position the beam at the starting point of the character. The symbol generator computer 21 (FIG. 1) responds to these words to draw the specifically identified characters at the specific X, Y locations as well as to apply the incremental translation and rotation words to these positions to provide the moving map illusion in a manner to be further described.

It will be appreciated that the programming required in the navigation computer 10 (FIG. 1) to generate, format and assemble the required digital words in response to the computer inputs so as to generate the specific map display for a particular mission is somewhat detailed and extensive. It will furthermore be appreciated that such programming is evidently well within the ordinary skill of digital computer programmers to process the input data by creating flow charts and translating same into computer routines and sub-routines for generating the specific digital words which are provided on the data bus 20 (FIG. 1). Such extensive though state of the art, programs will not be described in further detail herein in the interest of brevity.

Figure 5:
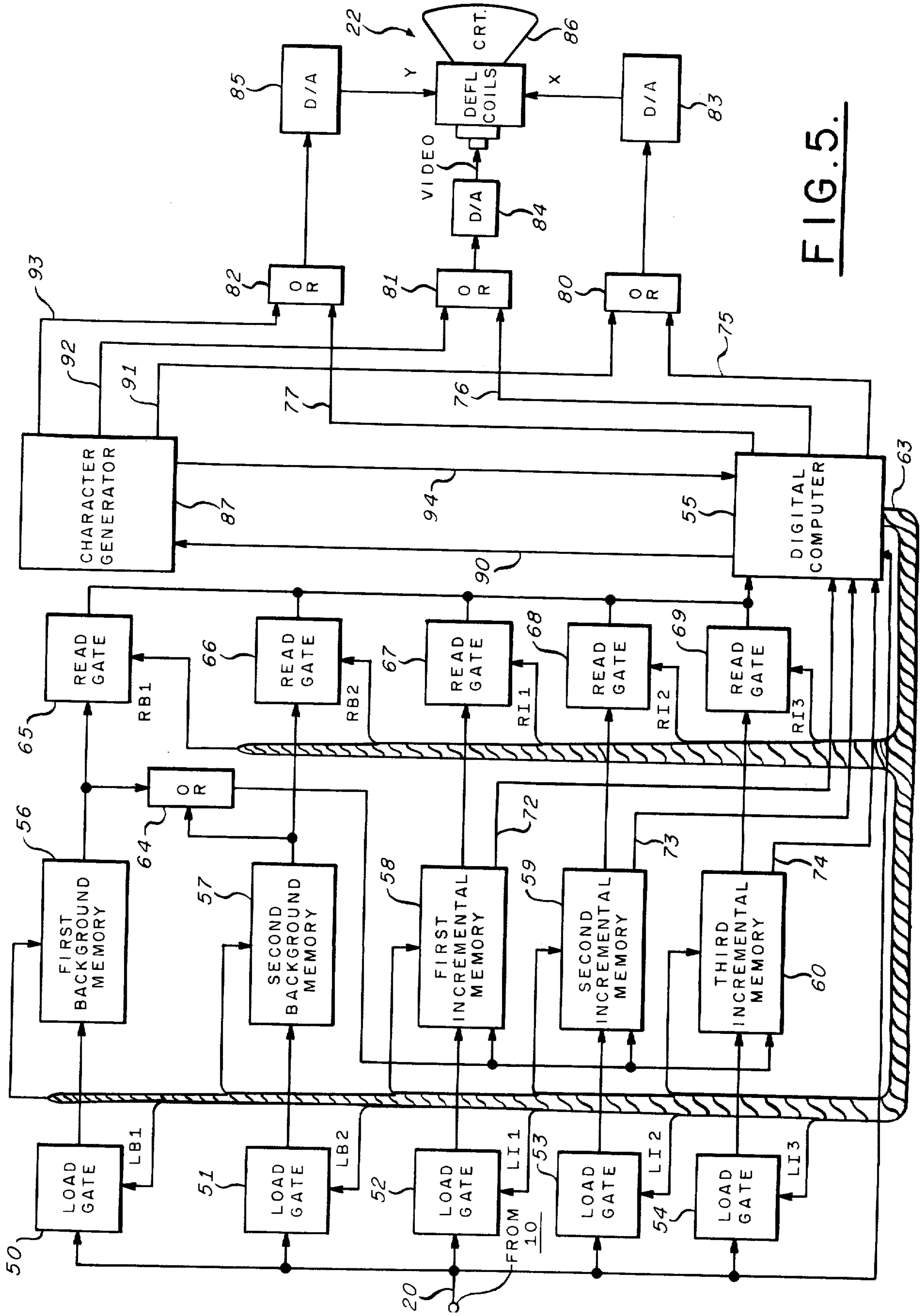
FIG. 5 is a schematic block diagram of the symbol generator computer utilized for the map display.

Referring now to FIG. 5 in which like reference numerals indicate like components with respect to FIG. 1, a schematic block diagram of the symbol generator computer 21 as well as the CRT portion of the map display unit 22 is illustrated. The bit serially transmitted data words on the bus 20 are provided as inputs to gates 50–54 as well as providing an input to a digital computer 55. The bit serial data stream is transmitted on the data bus 20 from the navigation computer 10 (FIG. 1) to the symbol generator 21 in an asynchronous manner i.e., the navigation computer 10 provides its data with the timing described above independently of the operation of the symbol generator computer 21. The outputs from the gates 50–54 are connected, respectively, as inputs to memories 56–60. The gates 50–54 as well as the memories 56–60 receive control signals from the digital computer 55 via a multi-conductor cable 63. The outputs from predetermined locations in the memories 56 and 57 are provided via an OR gate 64 to transfer data into a predetermined location in each of the memories 58–60 under control of signals on the cable 63 for reasons to be discussed.

The computer 55 controls the loading of the memories 56–60 through the gates 50–54 respectively via control signals on the cable 63 such that during a particular second of data transmission from the navigation computer 10 all of the background words are loaded through the gate 50 into the first background memory 56. During the next second of transmission, all of the background words are loaded through the gate 51 into the second background memory 57. This procedure continues for alternate seconds of operation of the system. The signal controlling the loading of the first background memory 56 through the gate 50 is termed $LB_1$ (load first background memory) and the signal controlling the loading of the second background memory 57 through the gates 51 is designated as $LB_2$ (load second background memory). The loading of the first and second background memories 56 and 57 will be described in further detail hereinafter.

During a particular 50 millisecond interval in which a group of incremental words are transmitted, the incremental words are loaded into the first incremental memory 58 through the load gate 52. In the next following 50 milliseconds of data transmission, the next group of incremental words is loaded into the second incremental memory 59 through the load gate 53. In a similar manner, during the next 50 milliseconds, the next transmitted group of incremental words is loaded into the third incremental memory 60 through the load gate 54. This procedure is continued for the following 50 millisecond intervals by again utilizing the memories 58, 59, 60 in sequence for the next occurring groups of incremental words respectively. The loading of the incremental memories 58–60 is controlled by the computer 55 via signals on the cable 63 to the gates 52–54. The signal controlling the load gate 52 designated as $LI_1$ (load first incremental memory). In a similar manner the signals controlling the load gates 53 and 54 are designated as $LI_2$ and $LI_3$, respectively. The manner in which the computer 55 controls the loading of the incremental memories 58–60 will be described in further detail hereinafter.

The outputs from the memories 56–60 are applied as inputs to gates 65–69 respectively, whose outputs are in turn commonly connected and applied as an input to the digital computer 55. The digital computer 55 also provides control signals on the cable 63 to the gates 65–69 to read the respective memories 56–60. The signal controlling the reading of the first background memory 56 through the read gate 65 is designated as $RB_1$ (read first background memory). In a similar manner, the reading of the second background memory 57 through the read gate 66 is designated as $RB_2$. The signal controlling the reading of the first incremental memory 58 through the read gate 67 is designated as $RI_1$ (read first incremental memory) and similarly the signals controlling the reading of the memories 59 and 60 through the gates 68 and 69 are designated as $RI_2$ and $RI_3$, respectively. The incremental memories 58–60 also provide direct inputs from predetermined locations therein to the computer 55 on leads 72–74 respectively, under control of signals from the computer 55 on the multiconductor control cable 63 for reasons to be explained.

The digital computer 55 provides digital signals on leads 75, 76 and 77 to control the map display unit 22 to draw patterns that comprise series of lines or vectors such as the patterns 40 and 42 of FIG. 2. The computer 55 provides these signals in response to the vector instructions and special instructions of the type discussed above that are loaded into the memories 56–60 in a manner to be further described hereinafter.

The digital signals on the leads 75–77 are applied as inputs to conventional digital OR circuits 80–82 respectively whose digital outputs are applied respectively to conventional digital-to-analog converters 83–85. The leads 75 and 77 provide digital X and Y position information through the OR gates 80 and 82 to the digital-to-analog converters 83 and 85 respectively. The converters 83 and 85 provide the corresponding X and Y deflection voltages to cathode ray tube circuitry associated with a cathode ray tube 86 of the map display unit 22. The lead 76 from the computer 55 provides digital signals representative of the intensity of the lines to be drawn and are provided through the OR gate 81 to the digital-to-analog converter 84 which provides its corresponding analog signal to the video or intensity grid input of the cathode ray tube 86.

The symbol generator computer 21 also includes a character generator 87 for drawing specific predetermined symbols or characters on the cathode ray tube 86 in response to code commands from the digital computer 55 on a lead 90. The character generator 87 is utilized to draw characters such as the symbols 30, 33, 34–37 as well as the alpha-numerical designations illustrated in FIG. 2. The data for drawing the predetermined symbols are stored in read only memories (ROM) within the character generator 87 and provide digital signals on leads 91–93 through the OR gates 80–82 to the digital-to-analog converters 83–85 respectively, to provide the X and Y deflection voltages as well as the video signals to the cathode ray tube 86 for displaying the characters in a manner to be further described.

Numerous character generators are known in the art which may be utilized in the system of the present invention. Examples, of such character generators may be found in the following U.S. patents: U.S. Pat. No. 3,325,802 issued June 13, 1967 to J. R. Bacon, "Complex Pattern Generation Apparatus"; U.S. Pat. No. 3,329,948 issued July 4, 1967 to C. P. Halsted, "Symbol Generating Apparatus"; U.S. Pat. No. 3,394,367 issued July 23, 1968 to R. H. Dye, "Symbol Generator"; U.S. Pat. No. 3,643,251 issued Feb. 15, 1972 to E. R. Kolb et al., "Control of Configuration Size and Intensity"; U.S. Pat. No. 3,660,833 issued May 2, 1972 to W. T. Blejwas Jr. et al., "System For Producing Characters on a Cathode Ray Tube Display By Intensity Controlled Point-To-Point Vector Generation";

and U.S. Pat. No. 3,713,134 issued Jan. 23, 1973 to H. M. Chaney, "Ditial Stroke Character Generator."

In operation, the navigation computer 10 (FIG. 1) transmits the background and incremental words as described above along the data bus 20 which words are received at the load gates 50–54 and as an input to the computer 55. Utilizing conventional registers, decoders and program sub-routines the computer 55 examines the four least significant digits of the incoming words and provides signals upon receipt of an End-Of-Incremental instructions (EOI) or an End-Of-Background instruction (EOB), respectively, in response to the unique coding of these four least significant bits of these instruction words. The computer 55 also contains an indicator of conventional design for remembering which of the background memories 56 and 57 is currently active for loading and which of the incremental memories 58–60 is similarly currently active. The computer 55 additionally includes a conventional counter for providing a signal after counting 13 background words. Upon receipt of an EOB instruction word, the computer 55 switches its active background memory indicator from the currently active background memory to provide indication with respect to the other background memory. In a similar manner, upon receipt of an EOI instruction, the computer 55 switches its active incremental memory indicator from the currently active incremental memory to the next following incremental memory of the three memories 58–60. Assuming, for example, that it is the beginning of a one-second data interval (FIG. 3) and that the first background memory 56 and the first incremental memory 58 are the currently active memories, these memories having been rendered active by the last EOI and EOB instructions in the previous one-second data interval. After receipt of the last EOB instruction from the previous frame, the computer 55 opens the load gate associated with the currently active incremental memory. In this example, the digital computer 55 provides the $LI_1$ signal to the load gate 52 to begin loading the first incremental memory 58. Since a one-second data interval associated with a frame begins with transmission of 37 incremental instruction words, these words are routed into the memory 58. Upon receipt of the EOI instruction at the end of the first group of incremental words, the computer 55 disables the load gate 52; enables the load gate associated with the active background memory (which in this example is the gate 50 for the memory 50); switches its internal active incremental memory indicator to the next incremental memory (which in this example is the memory 59) and starts its 13 background word counter. Since the load gate 50 is now enabled, the next group of background words are routed into the background memory 56. Since the group of background words comprises 13 words, the internal counter in the computer 55 which is counting these words as they are received, provides a signal to cause the computer 55 to close the load gate of the active background memory (which in this example is the gate 50) and open the load gate of the currently active incremental memory (which in this example is now the load gate 53). The next following group of incremental words is then routed into the second incremental memory 59 until receipt of the next following EOI instruction. Upon receipt of this EOI instruction, the computer 55 again closes the load gate for the currently active incremental memory; opens the load gate for the currently active background memory; steps its internal incremental memory indicator to the next incremental memory, and again starts its internal 13 word counter to control the routing of the next group of background words into the currently active background memory (which in this example is still the memory 56). This process continues with the incremental memories being sequentially utilized and the background words filling the currently active background memory. The procedure continues until receipt of the EOB instruction which occurs at the end of the one-second dtat interval causing the active background memory indicator internal to the computer 55 to switch to the other background memory.

The above described procedure is than repeated during the next one-second data interval during which the other background memory is utilized (which in this example is the memory 57). It will be appreciated that after the third incremental memory 60 is utilized, the first incremental memory 58 is then again used as the next in sequence. The data previously stored in a memory is in effect written over by the new data. The data is each incremental memory is, however, utilized prior to its being destroyed in an manner to be explained.

It will be appreciated that the above described loading scheme for the map display frame data is arbitrarily configured, other arrangements being possible. The internal logic of the computer 55 for controlling the loading of the data is conventional and readily implemented by normally skilled computer practitioners once the specific loading scheme is designated. It should be noted that in the above described loading scheme, only one load gate at any time is open thereby precluding the misrouting of data.

The data stored in the memories 56–60 are read by the computer 55 in an asynchronous manner with respect to the loading of the data. Internal to the computer 55 is a display refresh timer that provides a continuous train of pulses spaced 20 milliseconds apart. These pulses are utilized within the computer 55 to generate READ control signals so as to read the data from the memories 56–60 to draw a new map display frame on the cathode ray tube 86 to create the illusion of a moving map. Thus, the display is refreshed every 20 milliseconds, or 50 times a second, which rate is more than adequate to prevent display flicker. The computer 55 also includes a conventional indicator to provide a signal indicating which of the memories 56 and 57 is the currently active background memory for reading and another indicator for providing a signal representative of which of the memories 58–60 is the currently active incremental memory for reading. After receipt of an EOB instruction, the computer 55 switches the status of the active read indicator for the background memories from the currently indicated background memory to the other background memory upon the occurrence of the display refresh pulse following the receipt of the EOB instruction. In a similar manner, the computer 55 switches the status of the active read indicator for the incremental memories to the next sequential incremental memory upon the occurrence of the display refresh pulse following the receipt of an EOI instruction.

As previously described, the End-Of-Background instruction (EOB) always occurs as the last transmitted instruction in a onesecond interval and always occupies the same position in the sequence of words transmitted during the one-second frame interval. Thus, the EOB instruction always occupies the same location in either the first background memory 56 or in the second background memory 57. In a similar manner, since the ΔX, ΔY incremental translation instruction word and the track/heading angle (sine/cosine) incremental rotation instruction word always occur as the first and second words, respectively, of each incremental word group, these words always occupy the same memory locations in each of the incremental memories 58, 59 and 60.

Every 20 milliseconds that the display refresh timer internal to the computer 55 provides a display refresh pulse, the computer 55 extracts from the memories 56–60 the instruction words for drawing the information elements, i.e. the lines, symbols and characters that comprise a map display frame of information. The procedure that the computer 55 utilizes for the display refresh pulse following receipt of an EOB instruction is slightly different from the procedures followed for the remaining of the display refresh pulses in a one-second frame interval. Upon receipt of the EOB instruction, the computer 55 switches the status of the indicator for the currently active background memory for loading to the other background memory and accordingly generates appropriate signals on the cable 63 to so control the load gates 50 and 51. Upon the occurrence of the display refresh pulse following this EOB instruction, the computer 55 switches the status of the indicator for the currently active background memory for reading from the currently indicated background memory to the other background memory. Prior to operation of the system, the two internal indicators of the computer 55 with regard to loading and reading of the background memories are set to opposite memories with respect to each other such that as EOB instructions are received and display refresh pulses occur, the timing of the system as discussed above will preclude a requirement for simultaneously loading and reading the same background memory. Upon the occurrence of the display refresh pulse following the receipt of the EOB instruction, the computer 55 generates a control signal on the cable 63 to control the currently active background memory for reading to transfer this latest EOB instruction (which contains the initial βX, βY increments) from its predetermined location in the currently active background memory through the OR gate 64 and into predetermined locations in the incremental memories 58, 59 and 60. The computer 55 then provides signals on the cable 63 to the currently active incremental memory for reading, to transfer this EOB word from its predetermined location into internal storage in the computer 55 via the appropriate lead 72, 73 or 74. The computer 55 then provides further control signals on the cable 63 to open the read gate associated with the currently active background memory for reading to sequentially read the instruction words stored therein into the computer 55. Since each word is an instruction to draw a vector or a symbol the computer 55 augments the instructions as they are received with the βX, βY increments from the EOB word in accordance with equations (1) and (2) above and executes these augmented instructions so as to draw the associated map display information elements on the cathode ray tube 86 in a manner to be further described. The computer 55 then closes the read gate associated with the currently active background memory and opens the read gate associated with the currently active incremental memory to read and execute the instructions stored therein which instructions relate to those elements that must be redrawn 20 times a second such as, for example, the trend vector 32 (FIG. 2). As each of these so-called fast symbol instructions are read into the computer 55, the instructions are executed to draw the associated elements on the cathode ray tube 86. Thus in response to the display refresh pulse following the receipt of an EOB instruction, the instruction words from the previous one-second frame intreval stored in the currently active background memory, are augmented by the βX, βY increments from the EOB word transmitted during that interval so as to draw the information elements associated therewith as well as to draw the information elements associated with the fast instruction words from the active incremental memory so as to provide a currently updated map display frame on the cathode ray tube 86.

The computer 55 controls a slightly different sequence of operations upon occurrence of each of the internally generated display refresh pulses that did not immediately follow the receipt of an EOB instruction. For each of these display refresh pulses the computer 55 controls the currently active incremental memory via the cable 63 to read the current incremental translation instruction as well as the current track/heading angle (sine/cosine) incremental rotation instruction from the predetermined locations within the currently active incremental memory via the associated conductor 72, 73 or 74 into internal storage within the computer 55. The computer 55 then reads and executes the instructions in the currently active background memory augmenting these instructions now with the current translation and rotation incremental values and also reads and executes the current fast instructions in the manner described above thus generating successive map display frames incremented in accordance with the succession of incremental words thereby providing the moving map illusion discussed above.

Prior to the initial operation of the system, the currently active incremental memory indicators with regard to loading and reading, are set to the first incremental memory 58 and the third incremental memory 60, respectively. Thereafter, the timing of the occurrence of the EOI instructions and the timing of the 20 millisecond display refresh pulses, operate to assure that during any 20 millisecond refresh period of display no incremental memory requires simultaneously both loading and reading.

In summary, with regard to the loading and reading operations, during a one-second frame interval, an entire frame of background information is stored in a background memory and during the next successive one-second frame interval, another complete background frame is stored in the other backgrounnd memory. This loading process continues utilizing the alternate background memories for the alternately transmitted frames. During the successively occurring 1/20th second intervals, the corresponding incremental word groups are stored successively in the three incremental memories 58–60. During each 20 millisecond display refresh interval the computer 55 reads an entire background frame from the currently active background memory and augments the instructions with the current incremental instructions from the currently active incremental memory and executes the instructions as they are read and augmented. The computer 55 also reads and executes the fast instructions from the currently active incremental memory. Thus it is appreciated that during each of 50 successive 20 millisecond display refresh intervals, the computer 55 utilizes the same background frame from the currently active background memory switching to the other background memory after receipt of an EOB instruction. Additionally, the computer 55 utilizes the incremental words from the currently active incremental memory during each 20 millisecond interval between successive EOI instructions.

As previously discussed, the computer 10 (FIG. 1) generates and assembles the vector and symbol instruction words in accordance with its stored flight information as well as the current inputs thereto so as to transmit, during each one-second frame interval, background instruction words representative of the map information elements that comprise the horizontal situation of the aircraft at the beginning of each second and transmits at the end of the second, within the EOB instruction, the $\beta X$, $\beta Y$ increments which when combined with the transmitted background instructions, represents the current horizontal aircraft situation. Thereafter in each 1/20th of the next following second, new incremental translation and rotation instructions are generated by the navigation computer 10 (FIG. 1) in response to its input information, transmitted to the symbol generator computer (FIG. 5) and combined with the previously transmitted background words to maintain current the displayed aircraft horizontal situation map. For example, vector lines may be drawn representing a river or the like which lines are rotated and translated every 1/20th of a second to simulate the relative motion of the terrain as the aircraft flies thereover.

Referring to FIGS. 4 and 5, a vector word is interpreted by the symbol generator computer 21 as an instruction to draw a line from the present beam X, Y coordinates to the X, Y coordinates designated by the bit positions 21–31 of the word, at an intensity designated by the bit positions 10 and 11 of the word, with the type of line designated by the bit positions 5 and 6, and with the X and Y information of the instruction augmented by the current translation and/or rotation increment as designated by the bit positions 8 and 9 of the word as discussed above with regard to FIG. 4.

The computer 55 contains conventional instruction word registers, decoders and program sub-routines to examine the instructions extracted from the memories 56–60 and to route the groups of bits to appropriate circuitry to perform the functions designated thereby. When the computer 55 extracts a background vector instruction from either of the background memories 56 and 57, the computer 55 first recognizes that the word is a vector instruction by examining the uniquely coded bit positions 1–4 thereof. When the computer 55 determines that it is operating upon a vector instruction, it examines the bit positions 5 and 67 thereof to determine whether the vector should be a solid, long dash, short dash, or dotted line and activates appropriate conventional circuitry or calls the appropriate program sub-routine to so control the digital video signals on the lead 76 so as to provide the appropriate line format. Such video control circuitry and program sub-routines are conventional and well within the design skills of the digital computer routineer once the desired functions are designated. The computer 55 additionally examines the bit positions 10 and 11 of the vector instruction word to determine the video intensity with which the line is to be drawn and provides appropriate digital signals on the line 76 to control the video of the cathode ray tube 86. These digital video control signals on the lead 76 are provided through the OR gate 81 to the digital-to-analog converter 84 which is appropriately scaled to provide the analog video control signals to the cathode ray tube 86 so as to provide the desired beam intensities as designated by the legend at the bottom of FIG. 4.

The computer 55 examines the bit positions 8 and 9 of the vector instruction word and enters the appropriate program subroutine to augment the X, Y coordinates with the current incremental information as designated by the rotate/increment legend at the bottom of FIG. 4. Since the vector instructions are normally utilized for drawing map features that are subject to motion, the usual coding for the bits 8 and 9 will be to designate both rotation and incrementation of the instruction.

The computer 55 examines the 10-bit position (bits 12-31) and the 10-bit Y-position (bits 22-31) of the vector instruction and in accordance with the R-bits 8 and 9 thereof selectively applies the equations (1) and (2) above to augment the X, Y coordinates of the vector end point. Computer sub-routines for implementing the equations (1) and (2) are well known to digital computer programmers and will not be further described here for brevity. The computer 55 then transmits the augmented digital X position on the lead 75 through the OR gate 80 to the digital-to-analog converter 83 and similarly transmits the augmented digital Y-position via the lead 77 through the OR gate 82 to the digital-to-analog converter 85.

As is well known in systems of the type described, the digital-to-analog converters 83 and 85 contain respective storage registers and ladder networks for providing the analog X and Y signals proportional to the numbers held in the converter registers. When new digital values are applied via the OR gates 80 and 82, clock signals (not shown) are applied to the converter registers causing the registers to step at a uniform rate until the numbers stored therein equal the numbers applied thereto from the respective OR gates 80 and 82. Thus it is appreciated that the registers in the converters 83 and 85 step at a constant rate from a presently held value to a new value applied thereto causing the analog X and Y signals to change at a constant speed. As a result, the beam of the cathode ray tube 86 is moved at a constant speed from the previous X, Y coordinates the the new X, Y coordinates, thereby drawing the required line at a uniform intensity, which line characteristic and intensity are controlled by the video signal from the converter 84 as previously explained. Constant speed drawing arrangements such as the one described are well known in the art and will not be further detailed herein for brevity.

Thus it is appreciated that in response to a vector instruction, a vector of the appropriate line type and of the designated intensity will be drawn from the present beam position to the beam position designated by the X, Y coordinates contained within the instruction word or to the augmented X, Y coordinates contained in the word. Therefore, it is appreciated that the sequences of vector instructions comprising a background frame causes the map display unit 22 to draw complex map patterns which are incrementally translated and/or rotated to provide the moving map illusion. The beam may also be positioned to a particular point on the display by utilizing a vector instruction to that point with the intensity bits 10 and 11 coded for the OFF intensity thus drawing an invisible or blanked vector to the desired point.

In addition to the vector writing capability described above, the system also has the capacity to draw symbols such as alphanumeric or special symbols as well as strings of characters located at specific X, Y coordinates such as illustrated in FIG. 2. The symbols or characters are drawn within the map frame by providing the symbol instructions amongst the vector instructions that define the frame. The computer 55 determines that it has received a symbol instruction from the memories 56–60 by examining the uniquely coded four-least significant bits of the instruction word. The computer further examines bit-position 6 of the word to determine whether a large or a small character should be drawn in accordance with the binary state of the bit. This determination is instrumented in a conventional manner by controlling the scaling factor of the digital-to-analog converters 83 and 85 by, for example, adjusting the reference voltage thereof in a manner well known in the art. The computer 55 determines and controls the intensity of the drawn characters by examining the bit positions 9 and 10 in a manner similar to that described above with regard to the vector instruction words. The digital computer 55 further examines the bit positions 11–31 to provide the character identity codes which are transmitted to the character generator 87 via the lead 90 so as to draw the designated characters on the cathode ray tube 86.

As previously indicated, the character generator 87 may be configured in accordance with any of the U.S. Patents cited above. Generally, the character generator 87 includes read-only memories (ROM) which store the sequences of digital X position, video and Y-position control numbers which when applied to the digital-to-analog converters 83–85 via the leads 91–93 and the OR gates 80–82 respectively, cause the beam of the cathode ray tube 86 to draw the stored characters in a manner similar to the vector writing process described above. As seen in FIG. 2, it is convenient to draw strings of three characters in a horizontal row for the alpha/idents of the various VOR's, DME's, VORTAC's and the like. Thus, when the computer 55 receives a symbol instruction, it transmits the character identity codes to the character generator 87 which extracts from its ROM the sequences of numbers to draw the three symbols starting at the current X and Y position stored in the X and Y registers of the digital-to-analog converters 83 and 85, respectively. If it is desired to start the string of characters at other than the current beam position, the symbol identity instruction is preceded by an instruction to draw an invisible vector to the desired position. Since the vector instructions that position the symbols within the map display frame are augmented by the incremental translation and rotation words, the symbols drawn in a frame are also translated and rotated with the line patterns of the frame so as to retain the moving map illusion. When it is desired to draw single special symbols such as the symbols 33–37 and 41, the identity code for the symbol is provided by the bit groups of the symbol instruction word, the remaining two symbol identification bit groups being filled with zeros designating to the character generator 87 that no character is to be drawn for these groups.

When the character generator 87 has completed drawing the characters called for by the symbol instruction, control is returned to the digital computer 55 via a signal on a lead 94. The program of the digital computer 55 includes a sub-routine for an automatic re-set to the last known programmed vector position which resets the beam of the CRT to this position after completion of the generation of characters in response to the symbol instruction. In other words, when the computer 55 is controlling the cathode ray tube 86 to draw a pattern comprising a sequence of vector lines, the vector drawing program may be interrupted to draw a character string as a sub-routine of the main program routine after which the beam returns to continue drawing the vector pattern.

It will be appreciated that the incremental translation and incremental rotation instructions for generating the successive frames as described above, are derived from the velocity, directional and positional information provided to the navigation computer 10 from its various inputs. For example, the velocity information may be derived from the air data system 16, the directional information from the compass/heading system 13–15 and the positional information from the DME equipment 11. The track/heading angle incremental instruction may specifically be derived from the compass/heading system 13–15. It will be appreciated that the programming required in the navigation computer 10 to generate the incremental translation and rotation words so as to generate the appropriate map motion for a particular mission is somewhat detailed and extensive. It will furthermore be appreciated that such programming is well within the ordinary skill of digital computer programmers to process the input data by applying known flight equations and creating flow-charts and translating same into computer routines and subroutines for generating the specific digital incremental words.

As previously discussed, the incremental memories 58–60 (FIG. 5) provides so-called fast instruction words for drawing those elements which require redrawing every 50 milliseconds in order to provide the illusion of smooth motion. Such elements are those that move at a rate faster than the motion of the map display frames. The trend vector 32 (FIG. 2) is an example of such an element and comprises five dashed lines emanating forwardly from the aircraft symbol in a predictive manner and is derived in accordance with inputs into the navigation computer 10, for example from pilot inputs into the automatic flight control system 19. The airplane symbol 30 (FIG. 2) as well as the track/heading select cursor 33, which traverses on the associated moving tape, are also re-drawn every 50 milliseconds and are drawn utilizing the symbol and vector instructions in the manner described above. The track/heading numerical indication in the window 31 (FIG. 2) is provided by means of the special track/heading angle (degrees) instruction (FIG. 4) derived from the data inputs to the navigation computer 10 in the manner generally described above with regard to the drawing of symbols.

The above described embodiment of the invention was explained in terms of a map that moves with respect to the stationary airplane symbol 30. Thus it will be appreciated that the airplane symbol positioning vector instruction will always place the airplane symbol 30 near the center of the display at the same location for each frame. The described system also has the capability of providing a stationary map with a moving airplane symbol. In this mode of operation, the airplane symbol positioning vector is derived from the data inputs to the navigation computer 10 for appropriately moving the airplane symbol over the stationary map as the aircraft flies over the terrain. It will be appreciated that in this mode of operation the advantageous data transmission scheme described above need not necessarily be utilized since the stationary map mode does not require the high data rate of the moving map mode.

Although the above described embodiment of the invention was explained in terms of programmed general purpose digital computers, it will be appreciated that permanently wired special purpose computers could be utilized to the same effect. For example, equations (1) and (2) above could readily be implemented in a special purpose wired configuration. The invention has been described in terms of a moving map display for an area navigation system. It will be appreciated that the invention is also applicable to other synthetically generated motion display systems, for example the frame-by-frame drawing or photographing of animated cartoons or the like.

While the invention has been described in its preferred embodiment, it is to be understood that the words which have been used are words of description rather than limitation and that changes may be made within the purview of the appended claims without deparing from the true scope and spirit of the invention in its broadest aspects.

We claim:

1. A digitally controlled synthetically generated motion display system in which successively displayed frames of information provide an illusion of motion comprising first digital computer means for providing digital background words representative of information elements that comprise nonsuccessive frames and of the locations of said elements in said frames and for further providing digital incremental words representative of incremental motions of said information elements between successive frames, second digital computer means responsive to said background and incremental words for combining said incremental words with said background words to provide incremented words defining said successive frames, transmission means coupled said first digital computer means to said second digital computer means for transmitting said background and incremental words therebetween, and display means coupled to said second digital computer means for displaying said successive frames in response to said incremented words, thereby displaying a succession of frames providing an illusion of motion.

2. The system of claim 1 in which said transmission means comprises a single data bus along which said background and incremental words are transmitted in bit serial fashion.

3. The system of claim 1 in which said first digital computer means comprises means for providing interleaved groups of said background words and said incremental words to said transmission means.

4. The system of claim 3 in which said second digital computer means includes a plurality of background memory means, a plurality of incremental memory means, a plurality of background memory load gate means coupling said transmission means to said respective background memory means, a plurality of incremental memory load gate means coupling said transmission means to said respective incremental memory means, and reading means coupled to said background and incremental memory means.

5. The system of claim 4 in which said second digital computer means includes a digital computer coupled to said reading means for providing control signals to said background memory load gate means to route groups of said background words representative of said frames into said background memory means, respectively, providing control signals to said incremental memory load gate means to route said groups of incremental words into said incremental memory means, respectively, and providing control signals to said reading means to extract said background words and said incremental words for combining said incremental words with said background words thereby providing said incremented words.

6. The system of claim 3 in which each said group of incremental words includes an incremental translation word and an incremental rotation word, and said second digital computer means includes means for combining said incremental translation and rotation words with said background words to provide said incremented words representative of successive frames incrementally translated and rotated with respect to each other.

7. The system of claim 6 in which said background words include X and Y coordinate positions with respect to said frames, said incremental translation word includes $\beta X$ and $\beta Y$ translation increments, and said incremental rotation word includes sine $\phi$ and cosine $\phi$ rotation increments.

8. The system of claim 7 in which said second digital computer means includes means for combining said incremental translation and rotation words with said background words in accordance with $$X_h = X + \Delta X$$
$$Y_h = Y + \Delta Y$$
$$X_k = X_h \cos\phi + Y_h \sin\phi$$
$$Y_k = X_h \sin\phi + Y_h \cos\phi$$

thereby providing said incremented words representative of successive frames incrementally translated and rotated with respect to each other.

9. The system of claim 3 in which said first digital computer means comprises means for providing further digital words in each said group of incremental words representative of further information elements requiring redefining in each said successive frame, and said display means includes means for diplaying said further information elements in each said successive frame in response to said further digital words.

10. The system of claim 1 in which said display means comprises cathode ray tube means including X and Y deflection means.

11. The system of claim 10 further including digital-to-analog converter means responsive to said incremented background words and coupled to said deflection means to move the beam of said cathode ray tube means to draw said information elements represented by said incremented background words.

12. The system of claim 1 in which said first digital computer means comprises means for providing said background words as vector words representative of line elements and as symbol words representative of predetermined symbols, said second digital computer means includes character generator means for storing digital symbol signals representative of predetermined coordinates of said symbols and for providing the specific digital signals for a specific symbol in response to the symbol word therefor, and said display means includes means coupled to said character generator means for diplaying said predetermined symbols in response to said digital symbol signals.

13. The system of claim 1 in which said motion display system comprises a moving map display and said information elements comprise map features.

14. A method for reducing data transmission rate in digitally controlled synthetically generated motion displayed systems in which successively displayed frames of information provide an illusion of motion comprising the steps of generating digital background words representative of information elements that comprise non-successive frames and of the locations thereof in said frames, generating digital incremental words representative of incremental motions of said information elements between successive frames, transmitting said background and incremental words, combining said transmitted incremental words with said transmitted background words to provide incremented words defining said successive frames, and displaying said successive frames in response to said incremented words.

15. The method of claim 14 in which said generating steps include the steps of generating interleaved groups of said background words and said incremental words, and said transmitting step comprising the step of transmitting said interleaved groups of words.

* * * * *